(12) United States Patent
Eller et al.

(10) Patent No.: US 9,452,369 B2
(45) Date of Patent: Sep. 27, 2016

(54) VAPORIZER

(71) Applicants: BorgWarner BERU Systems GmbH, Ludwigsburg (DE); Tenneco GmbH, Edenkoben (DE)

(72) Inventors: Martin Eller, Ludwigsburg (DE); Nicolaus Wulff, Stuttgart (DE); Andreas Ruthmann, Eberdingen (DE); Tobias Inclan, Lauterbourg (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 327 days.

(21) Appl. No.: 14/183,609

(22) Filed: Feb. 19, 2014

(65) Prior Publication Data

US 2014/0233927 A1    Aug. 21, 2014

(30) Foreign Application Priority Data

Feb. 21, 2013   (DE) .......................... 10 2013 101 703

(51) Int. Cl.
*B01D 1/00*   (2006.01)
*B01B 1/00*   (2006.01)

(52) U.S. Cl.
CPC ............. *B01D 1/0017* (2013.01); *B01B 1/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,216,182 A | * | 11/1965 | Cochran ................ | B01D 45/08 159/31 |
| 3,969,449 A | * | 7/1976 | Shires ...................... | B01D 1/14 261/153 |
| 4,459,948 A | * | 7/1984 | Bauer ..................... | F23Q 7/001 123/145 A |
| 4,549,071 A | * | 10/1985 | Hatanaka ................ | F23Q 7/001 123/145 A |
| 4,924,936 A | * | 5/1990 | McKown ............... | B01D 1/065 118/715 |
| 5,319,180 A | * | 6/1994 | Locher ................... | F23Q 7/001 219/270 |

(Continued)

FOREIGN PATENT DOCUMENTS

| | | |
|---|---|---|
| DE | 10 2005 052 256 A1 | 5/2006 |
| DE | 10 2005 034 888 A1 | 2/2007 |
| DE | 10 2005 044 676 A1 | 3/2007 |

*Primary Examiner* — Dana Ross
*Assistant Examiner* — Renee Larose
(74) *Attorney, Agent, or Firm* — Bose McKinney & Evans LLP

(57) ABSTRACT

The invention relates to a vaporizer comprising a housing, a housing cap, which covers an end of the housing and has a vapor discharge opening, and a heating element, which sits in the housing and protrudes into the housing cap, wherein an annular gap is provided between the heating element and the housing and also between the heating element and the housing cap and connects an inlet opening in the housing to the vapor discharge opening. In accordance with this disclosure, the annular gap has a starting portion, a middle portion and an end portion, wherein the starting portion and the middle portion are arranged in the housing and the end portion is arranged in the housing cap, and wherein the annular gap is wider in the middle portion than in the starting portion.

16 Claims, 1 Drawing Sheet

(56) References Cited

U.S. PATENT DOCUMENTS

| | | | | |
|---|---|---|---|---|
| 6,199,775 B1 * | 3/2001 | Dallmeyer | ............ | F02M 37/22 123/470 |
| 8,901,467 B2 * | 12/2014 | Radmacher | ............ | B28B 1/008 123/145 A |
| 2008/0253755 A1 * | 10/2008 | Smith | ............ | A61L 9/037 392/386 |
| 2008/0295784 A1 * | 12/2008 | Valensa | ............ | F22B 1/1807 122/367.3 |
| 2011/0104587 A1 * | 5/2011 | Poshusta | ............ | B01B 1/005 429/513 |
| 2013/0011319 A1 * | 1/2013 | Bernstein | ............ | C03B 37/01413 423/335 |

* cited by examiner

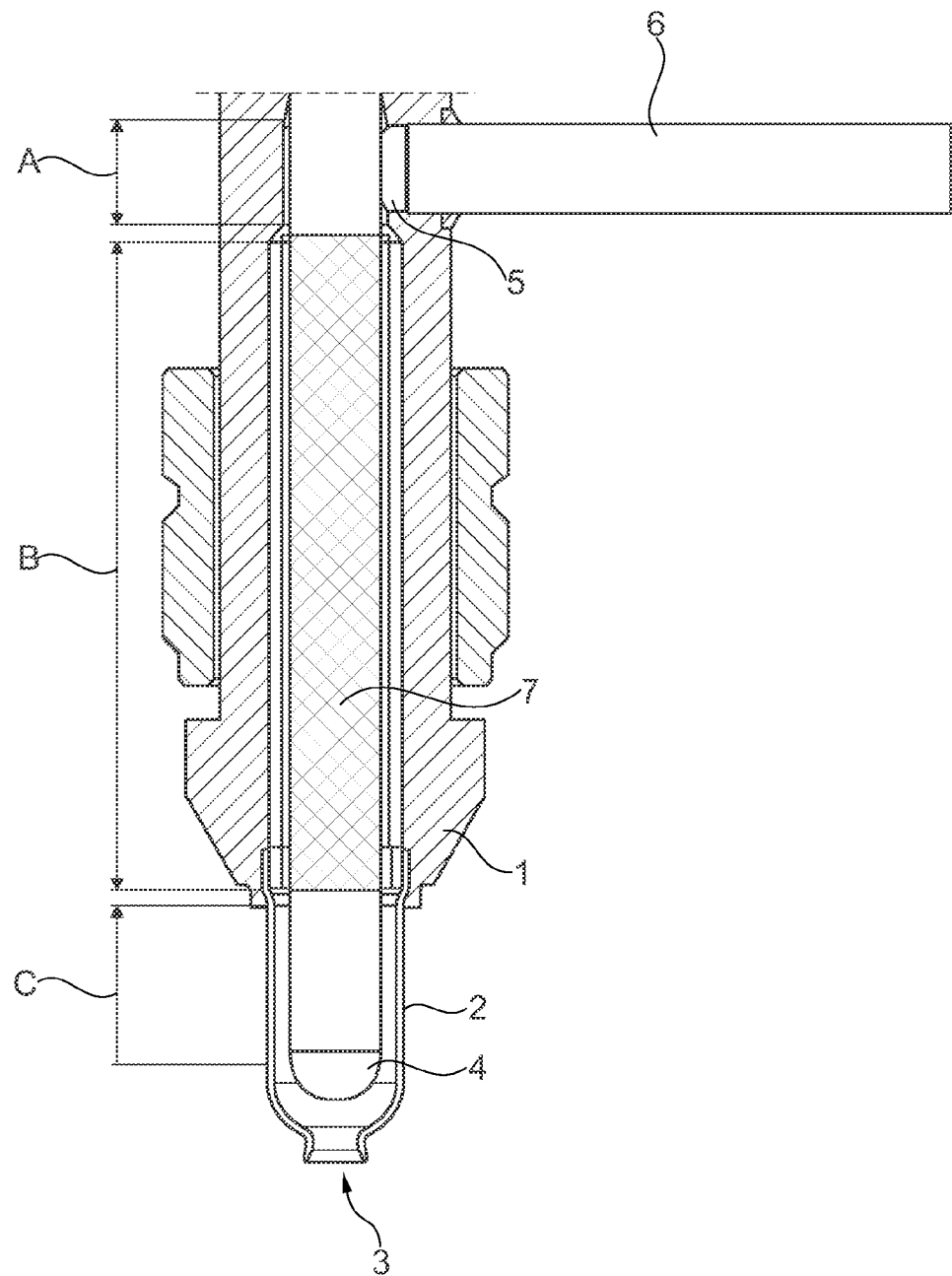

VAPORIZER

RELATED APPLICATIONS

This application claims priority to DE 10 2013 101 703.7, filed Feb. 21, 2013, the entire disclosure of which is hereby incorporated herein by reference in its entirety.

BACKGROUND

The invention relates to a vaporizer. Vaporizers are generally known from DE 10 2005 034 888 A1. The known vaporizer comprises a housing, a housing cap, which covers an end of the housing and has a vapor discharge opening, and a heating element, which sits in the housing and protrudes into the housing cap. An annular gap which connects an inlet opening of the housing to the vapor discharge opening is located here between the heating element and the housing and also between the heating element and the housing cap.

Ideally, only vapor should escape from a vapor discharge opening of a vaporizer. In fact, a greater or lesser amount of unvaporized liquid exits from the vapor discharge opening of vaporizers in practice.

SUMMARY

The present invention provides a way in which the amount of unvaporized liquid can be reduced.

In a vaporizer according to this disclosure, the annular gap located between the heating element and the housing and also between the heating element and the housing cap is divided into a starting portion, a middle portion and an end portion. The starting portion and the middle portion are located between the housing and the heating element. The end portion is located between the housing cap and the heating element. In the starting portion the annular gap is narrower than in the middle portion.

A much more thorough vaporization process can thus be implemented. A starting portion with a smaller annular gap width than the middle portion specifically causes a more uniform distribution of the liquid to be vaporized in the peripheral direction of the annular gap. A narrow starting portion of the annular gap prevents liquid introduced into the vaporizer from flowing easily along one side of the heating element without distributing in the peripheral direction. The heating element is therefore cooled more uniformly by the liquid in the annular gap of a vaporizer according to this disclosure. The liquid is consequently heated more uniformly and is vaporized completely.

A more uniform distribution in the peripheral direction of the heating element of the liquid to be vaporized additionally also prevents coking in the case of fuel vaporization. Deposits of fuel residues generally form specifically at those points of the heating element past which only little fuel flows. Due to a more uniform liquid distribution, the deposition of fuel residues and therefore also coking can therefore be counteracted.

In an advantageous refinement of this disclosure, a flow obstacle is arranged in the middle portion of the annular gap and reduces the flow velocity of the liquid to be vaporized and/or lengthens the flow path. The flow obstacle can be formed for example of wire or ceramic fibres. Wire mesh or ceramic wool is well suited. The flow obstacle may also be large-pored ceramic, open-pored metal foam or ceramic foam, or wire wound in a coiled manner around the heating element. The flow obstacle may also be integrated into the housing. A flow obstacle increases the residence time of the liquid in the middle portion of the annular gap and thus ensures improved absorption of heat.

The flow obstacle preferably ends before the end portion and only starts after the starting portion. The annular gap is thus empty in the starting portion and in the end portion. Since the starting portion is free from flow obstacles, liquid to be vaporized can be distributed quickly and uniformly around the heating element, even if the inlet opening is arranged laterally on the housing. Likewise, flow obstacles are not advantageous in the end portion. Specifically, the liquid is actually vaporized in the end portion once it has been heated in the middle portion to close to the boiling point. It is therefore advantageous if a flow obstacle is located only in the middle portion of the annular gap.

The middle portion preferably has a greater length than the starting portion. In order to distribute the liquid to be vaporized around the heating element, a much shorter length than for heat absorption is sufficient. For example, the middle portion can be more than three times as long as the starting portion. It is particularly advantageous if the middle portion has a length that is at least four times the length of the end portion.

The middle portion preferably has a greater length than the end portion. The liquid is to be heated in the middle portion to close to the boiling point, such that a low energy feed in the end portion is sufficient to vaporize the preheated liquid. For example, the middle portion can be more than twice as long as the starting portion. It is particularly advantageous if the middle portion has a length that is at least three times the length of the end portion.

In another advantageous refinement of this disclosure, the end portion has a smaller gap width than the middle portion. Vapor can thus exit particularly well and with a sufficiently high exit speed from the vapor discharge opening.

In another advantageous refinement of this disclosure, the end portion has a larger gap width than the starting portion. An advantageous pressure of the vaporized liquid can thus be achieved, which is favorable for the flowing out of vapor from the vapor discharge opening.

BRIEF DESCRIPTION OF THE DRAWINGS

Further details and advantages of these teachings will be explained on the basis of an illustrative embodiment with reference to the accompanying drawings, in which:

FIG. 1 shows a schematic illustration of a vaporizer in a partly sectional view.

DETAILED DESCRIPTION

The embodiments described below are not intended to be exhaustive or to limit the invention to the precise forms disclosed in the following detailed description.

Rather, the embodiments are chosen and described so that others skilled in the art may appreciate and understand the principles and practices of this disclosure.

The vaporizer illustrated in FIG. 1 is used to vaporize fuel. The vaporizer has a housing 1, which at one end carries a housing cap 2 which has a vapor discharge opening 3. A heating element 4 is arranged in the housing 1. An annular gap, which connects a liquid entry opening 5 to the vapor discharge opening 3, is located between the heating element 4 and the housing 1 and also between the heating element 4 and the housing cap 2. In the shown example a feed line 6 is connected to the liquid entry opening 5.

An annular gap, which leads from the liquid entry opening 5 to the vapor discharge opening 3, is located between the heating element 4 and the housing 1 and also between the heating element 4 and the housing cap 2. This annular gap has a cylindrical starting portion A, a cylindrical middle portion B and a cylindrical end portion C. The starting portion A and the middle portion B are located in the housing 1. The end portion C is located in the housing cap 2.

The width of the annular gap increases between the starting portion A and the middle portion B. The gap width reduces at the transition from the middle portion B to the end portion C to a value that is greater than the value of the gap width of the starting portion A.

The relatively small gap width of the starting portion A ensures that the liquid to be vaporized is distributed around the heating element 4. In the middle portion B, the annular gap contains a flow obstacle 7, for example made of ceramic fibres or of wire. Ceramic fibres and wire can be arranged in the annular gap in an unordered manner, for example as a nonwoven fabric, or in an ordered manner, for example as a mesh. Only in the middle portion B is such a flow obstacle 7 located. The flow obstacle 7 increases the residence time of the liquid in the middle portion B and improves the absorption of heat.

The starting portion A, the middle portion B and the end portion C are cylindrical. Thus the width of the annular gap is constant in the starting portion A, in the middle portion B, and in the end portion C. At the ends of the portions A, B and C, the inner and/or outer diameter of the annular gap can change in a transition region, for example conically. At the end of the end portion C, the width of the annular gap can change due to a rounded tip of the glow plug 4. The total length of these non-cylindrical portions is negligible in relation to the total length of the annular gap and for example is less than one tenth of the total length of the annular gap.

The starting portion A may have a gap width in the range from 0.3 mm to 0.8 mm, for example from 0.4 mm to 0.6 mm. The middle portion B may have a gap width in the range from 0.8 mm to 1.5 mm, for example from 1.0 mm to 1.2 mm. The end portion C may have a gap width in its cylindrical part in the range from 0.5 mm to 1.1 mm, for example 0.7 to 0.9 mm.

The middle portion B is longer than the starting portion A and also longer than the end portion C. The end portion C may be longer than the starting portion A. For example, the length of the middle portion B may be more than three times the length of the starting portion A and more than twice the length of the end portion C.

The ratio of the annular gap volume to length, for the starting portion A, may be in the range from 0.6 mm to 1.0 mm, for example 0.7 mm to 0.8 mm. The ration of the volume of the middle portion B of the annular gap to the length of the middle portion B may be in the range from 3.0 mm to 4.5 mm, for example 3.5 mm to 4.0 mm. The ratio of the volume of the end portion C of the annular gap to the length of the end portion C may be in the range from 1.5 mm to 2.5 mm, for example 1.8 mm to 2.2 mm.

The proportion of the total volume of the annular gap taken up by the starting portion A should be less than one tenth, for example no more than one twentieth, but may also be greater. The proportion of the total volume of the annular gap taken up by the middle portion B may be between 50% and 95%, for example between 60% and 90%, in particular between 70% and 90%. In the illustrated illustrative embodiment, the proportion of the total volume of the annular gap taken up by the middle portion B is between 80% and 85%.

The proportion of the total volume of the annular gap taken up by the end portion C should be less than one fifth, for example between 10% and 20%, but may also be greater or smaller.

The vapor discharge opening 3 is formed as a nozzle that widens starting from a narrow point. The nozzle angle may be in the range from 30° to 90°, for example 30° to 50°. The opening diameter of the nozzle may be between 1 mm and 3 mm, for example. In the illustrated illustrative embodiment, the opening diameter of the nozzle is between 1.8 mm and 2.6 mm.

The edge of the vapor discharge opening 3 may form a stripping edge and may thus counteract a deposition of fuel residues. The heating element 4 may have a coated or roughened surface, in particular in the middle portion. A rough surface can improve the transfer of heat from the heating element 4 to the liquid to be vaporized. A coating can increase the roughness of the surface and/or can have a catalytic effect in order to prevent coking and/or to burn fuel residues more easily.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

REFERENCE SIGNS

1 housing
2 housing cap
3 vapor discharge opening
4 heating element
5 liquid entry opening
7 flow obstacle
A starting portion
B middle portion of the annular gap
C end portion of the annular gap

What is claimed is:

1. A vaporizer comprising:
   a housing having an inlet opening;
   a housing cap covering an end of the housing and having a vapor discharge opening;
   a heating element arranged in the housing and protruding into the housing cap; and
   an annular gap disposed between the heating element and the housing and between the heating element and the housing cap, the annular gap connecting the inlet opening to the vapor discharge opening, the annular gap comprising a starting portion, a middle portion and an end portion, the starting portion and the middle portion being arranged in the housing and the end portion being arranged in the housing cap, wherein the annular gap is wider in the middle portion than in the starting portion.

2. The vaporizer according to claim 1, wherein the middle portion has a greater length than the starting portion.

3. The vaporizer according to claim 1, wherein the middle portion has a greater length than the end portion.

4. The vaporizer according to claim 1, further comprising a flow obstacle arranged in the middle portion of the annular gap.

5. The vaporizer according to claim 4, wherein the flow obstacle is wire and/or ceramic fibers.

6. The vaporizer according to claim 1, wherein the starting portion has a constant width.

7. The vaporizer according to claim 1, wherein the middle portion has a constant width.

8. The vaporizer according to claim 1, wherein the end portion has a constant width.

9. The vaporizer according to claim 1, wherein the gap width reduces between the middle portion and the end portion.

10. The vaporizer according to claim 1, wherein the annular gap is wider in the end portion than in the starting portion.

11. The vaporizer according to claim 1, wherein the starting portion of the annular gap has a gap width in the range from 0.3 mm to 0.8 mm.

12. The vaporizer according to claim 1, wherein the middle portion of the annular gap has a gap width in the range from 0.8 mm to 1.5 mm.

13. The vaporizer according to claim 1, wherein the width of the annular gap reduces at a transition between the middle portion to the end portion to 0.5 mm to 1.1 mm.

14. The vaporizer according to claim 1, wherein the volume of the starting portion of the annular gap accounts for less than one tenth of the total annular gap volume.

15. The vaporizer according to claim 1, wherein the volume of the middle portion of the annular gap is between 50% and 90% of the total annular gap volume.

16. A vaporizer, comprising:
a housing having an inlet opening;
a housing cap covering an end of the housing and having a vapor discharge opening;
a heating element arranged in the housing and protruding into the housing cap;
an annular gap disposed between the heating element and the housing and between the heating element and the housing cap, the annular gap connecting the inlet opening to the vapor discharge opening; and
the annular gap comprising a cylindrical starting portion, a cylindrical middle portion and a cylindrical end portion;
wherein the cylindrical starting portion and the cylindrical middle portion are arranged in the housing, the cylindrical end portion is arranged in the housing cap, the annular gap is wider in the cylindrical middle portion than in the cylindrical starting portion, the cylindrical middle portion is at least three times as long as the cylindrical starting portion, and the cylindrical middle portion is at least twice as long as the cylindrical end portion.

* * * * *